United States Patent [19]

Krüger et al.

[11] Patent Number: 4,737,951
[45] Date of Patent: Apr. 12, 1988

[54] EXCHANGE WITH ERROR CORRECTION

[75] Inventors: Johann E. W. Krüger, Quickborn; Wolfang E. Jasmer, Hamburg, both of Fed. Rep. of Germany

[73] Assignee: U.S. Philips Corp., New York, N.Y.

[21] Appl. No.: 921,981

[22] Filed: Oct. 22, 1986

[30] Foreign Application Priority Data

Oct. 22, 1985 [DE] Fed. Rep. of Germany ....... 3537451

[51] Int. Cl.⁴ .......................................... H04Q 11/04
[52] U.S. Cl. .................................................. 370/58
[58] Field of Search ................. 370/58, 118, 13, 16; 340/825.8, 825.79; 371/30, 37; 178/3

[56] References Cited

U.S. PATENT DOCUMENTS

| | | | |
|---|---|---|---|
| 3,886,318 | 5/1975 | Charransol et al. | 370/16 |
| 4,074,077 | 2/1978 | Charransol et al. | 370/58 |
| 4,456,987 | 6/1984 | Wirsing | 370/58 |
| 4,489,412 | 12/1984 | Duplessis et al. | 370/58 |
| 4,535,442 | 8/1985 | Maddern et al. | 370/58 |
| 4,608,684 | 8/1986 | Upp | 370/58 |

Primary Examiner—Douglas W. Olms
Attorney, Agent, or Firm—Thomas A. Briody; Jack Oisher; William J. Streeter

[57] ABSTRACT

A switching exchange in which data on each incoming line are applied to an encoder which produces redundant code words therefrom. The switching matrix is divided into n sub-switching matrices which each transmit a different sub-code word. The outputs of the sub-switching matrices are connected to a decoder which corrects erroneous data words and in addition indicates the occurrence of a fault. Each sub-switching matrix may have its own setting processor receiving identical setting information from a central switching processor. In the event of failure of a sub-switching matrix the decoder can correctly restore the data words. It therefore is possible to effet repair simply replacing the defective sub-switching matrix without switching-off the exchange.

6 Claims, 3 Drawing Sheets

EXCHANGE WITH ERROR CORRECTION

BACKGROUND OF THE INVENTION

1. Field of the Invention

The invention relates to an exchange for computer-controlled switching of a plurality of lines each of which carry digital time-interleaved data, via a switching matrix, which transmits the data in parallel in the form of data words comprising a plurality of data bits.

2. Description of the Related Art

Such exchanges in which more specifically the switching matrices have different structures, are generally known and are used for switching a large number of subscriber stations. As a fault-dependent failure of such an exchange affects a large number of subscribers, the reliability of exchanges of this type must satisfy high requirements, particularly the computers for producing the control data for setting the switching matrices, since a fault in this control computer may cause the total overall exchange to fail. It is consequently customary to use in switching exchanges at least two or three identical control computers, as is described, for example, in the periodical "Phillips Technical Review", Vol. 41, No. 1983/84, No. 1, pages 1 to 11. This article describes also, how, by using a special fault-tolerant concept it can be obtained that one of a plurality of computers may fail without causing breakdown of the total switching exchange.

However in all the concepts no fault protection of the actual switching matrices is used, as it is assumed that, for example a faulty component only affects a particular switched path, that is to say the two participating subscribers, it being possible in certain switching matrix concepts to switch an existing connection, so that the faulty place is bypassed, when the fault has been determined. To determine a fault in a newly set-up connection it is customary to transmit pre-defined test data via the link before the data to be transmitted and to check at the end of the link whether these test data are correctly received. Such a method is however not only time-consuming but in many types of switching matrices, or when there are many faulty positions it is not possible to establish a path bypassing the faulty place, and, in addition, faults occurring during the period of time a switched path exists cannot be detected without further measures. Particularly during the transmission of data this may have very serious consequences.

It is indeed known to protect the data to be transmitted by adding redundant bits thereto, which may be realized in various ways, or by a complete encoding, but then, depending on the quantity of redundant bits added to the data, a more or less complicated reconstruction of mutilated data words and at any rate a complicated recognition of mutilated data words which can not be restored again may be the result. However, when an error occurs and is detected it is extremely difficult to repair it since a switching exchange must never be switched off.

SUMMARY OF THE INVENTION

The invention has for its object to provide a switching exchange of the type defined in the opening paragraph, in which the data to be transmitted are transmitted fail-safe via the switching matrix in such a way that should defects occur, more specifically in the switching matrix, mutilated data words can be restored and further mutilated data words can be recognized to a certain extent, and repairing failing component parts in a simple manner without switching-off the switching exchange is possible.

According to the inventionm this object is accomplished in that the switching matrix is preceded by an encoder which from each data word produces a code word having a number of code bits exceeding the number of data bits of each data word and applies it to the switching matrix, which is divided into a number of parallel sub-switching matrices for always transmitting a sub-code word consisting of a portion of the code bits, and that the switching matrix is followed by a decoder which produces the original data words from all the sub-code words, the code words and the sub-code words being structured such in a manner known per se, that when there is at least one mutilated sub-code word the decoder produces the correct data words and an error signal indicating the mutilated sub-code word.

GENERAL DESCRIPTION

The invention utilizes the encoding rules described in said publication in a special way for protecting the data to be transmitted from faults. As a result thereof, in the transmitted data, faults within only one sub-switching matrix do not become apparent, but they are nevertheless detected. Fault-detection is also obtained when more than one sub-switching matrix for the same transmission path is beset with faults, it then however being impossible for the data words to be restored again. A simultaneous occurrence of several faults is however very improbable. Fault monitoring can also be continuously effected during operation, that is to say after a transmission path has been set up, so that testing a transmission path before switch-through of a connection can be omitted.

When a failure has occurred in a sub-switching matrix, this sub-switching matrix can be easily replaced during operation, as it is very well possible to restore the transmitted data words by means of the remaining sub-switching matrices. Consequently, there is no need to switch the switching exchange off for repair purposes.

An advantageous encoding consists in that the number of code bits of each code word is twice as large as the number of data bits of each data word. This is an adequate compromise between the additional cost and design efforts required in the switching matrix, and the possibilities of fault correction.

The control of the switching matrices is effected by a central switching computer which determines the path to be switched-through on, more specifically, the basis of the signalling data. Often the signals produced by the switching computer which indicate the path to be switched-through are applied to a setting computer which is directly assigned to the switching matrix and, on the basis of these signals, effects the switch-through of the path, for example driving the individual switching points. One embodiment of the invention for such a switching exchange is characterized in that to each sub-switching matrix its own, preferably fault-tolerant setting computer is assigned and all the setting computers are controlled in parallel by one, preferably fault-tolerant, central switching computer. Thus a fault in one of the setting computers is prevented from effecting breakdown of the switching exchange, as a failing setting computer which in a sub-coupling matrix switches an incorrect path acts as a fault in a sub-switching matrix in the decoder provided subsequent to the switching matrix, which fault is detectable and correctable. The probability of incorrect switching operations is so small as to be disregarded, since at least a given number of setting computers should have to make identical errors. When the setting computer is combined in one module together with the associated sub-switching matrix, the complete module can be replaced during operation. At first this indeed causes incorrect connections since the setting computer has not been loaded yet with all the data required for the switching operation, which becomes apparent as an error in the sub-switching matrix, which error can be corrected in the decoder. As, however, connections have only a limited duration and new connections are continuously set-up, whose setting data are then also applied to the setting computer, the incorrect data words produced by a replaced component become increasingly less, until finally only those paths are still active which were switched after replacement of the components. An exchange of data among the setting computers is consequently not required and no synchronizations problems occur.

The additional cost and design efforts for the fault-tolerant transmission of data within the switching exchange according to the invention are not only the additional bulk of the switching matrix but also the encoder and the decoder. Particularly the decoder must have a relatively large bulk since the number of code bits exceeds the number of data bits. In order to reduce this bulk it is effective, in accordance with a further embodiment of the invention, for the encoder preceding the switching matrix to be formed by at least two sub-encoders each of which receives a different portion of the data words and produces a sub-code word, that each sub-switching matrix transmits a sub-code word from always a different portion of the code bits of at least some sub-code words, so that all the sub-switching matrices transmit all the sub-code words, and that the decoder subsequent to the switching matrix is formed by a number of sub-decoders equal to the number of sub-encoders which are so connected to the outputs of the switching matrix that each sub-decoder always receives all the code bits of a sub-code word and produces the corresponding matrix of the data word. In this situation the sub-encoders and the sub-decoders may basically be of the same structure. It is however alternatively possible to use sub-encoders which are not physically separated, but to implement the encoder such that the corresponding sub-code words can be taken therefrom. However, separating the decoder into a plurality of sub-decoders results in a significantly lower total cost, as will be explained hereinafter, whilst the possibility of correcting or detecting incorrect sub-code words deteriorates only slightly in the case of a normal error-probability. Because of the fact that each sub-switching matrix transmits a different portion of the code bits of at least some sub-code words a single defective subswitching matrix only results in each sub-decoder receiving indeed a mutilated, but correctable sub-code word and consequently the total data word can still be correctly restored.

In decoding the code words the by far largest number of incorrect code words can be recognized as incorrect even if they cannot be corrected, the decoder then producing a corresponding error signal which may comprise several bits, so as to distinguish between different faults. In the publication mentioned in the foregoing the error signals of the decoder are evaluated by an associated computer. When this principle is used correspondingly in the present invention, a further embodiment is characterized, in that an error store associated with the decoder is connected to the error signal outputs of the decoder and to an arrangement indicating the transmission path via the switching matrix, more specifically a counter counting the data words within a frame, that at the occurrence of an error signal this signal and the indication of the transmission path are stored in the error store and a corresponding signal is sent to a supervision computer and that the supervision computer retrieves the content of the error store via a data bus and erases the error store. Acting thus, the supervision computer can basically operate independently from the error messages, it also being permitted that after the occurrence of an error signal and its retrieval by the supervising computer still further error signals occur which are then not stored. When, however, a permanent defect occurs in a sub-switching matrix, the error signals produced thereby will occur periodically so that, when there are several defects, each error will be detected somewhere at some time. It is, however, alternatively possible for the error store to store the signals of several consecutively occurring code word errors, and the supervision computer only erases the several retrieved signals of the stored errors. In this situation the error store may be of the type commonly referred to as a FIFO store, so that when the supervision computer accesses the store with the object of retrieving the stored error signals, it retrieves several of these signals but not necessarily all the instantaneously stored error signals.

BRIEF DESCRIPTION OF THE DRAWINGS

Embodiments of the invention will now be described in greater detail with reference to the accompanying drawing. Herein.

DESCRIPTION OF THE PREFERRED EMBODIMENTS

Figure 1:
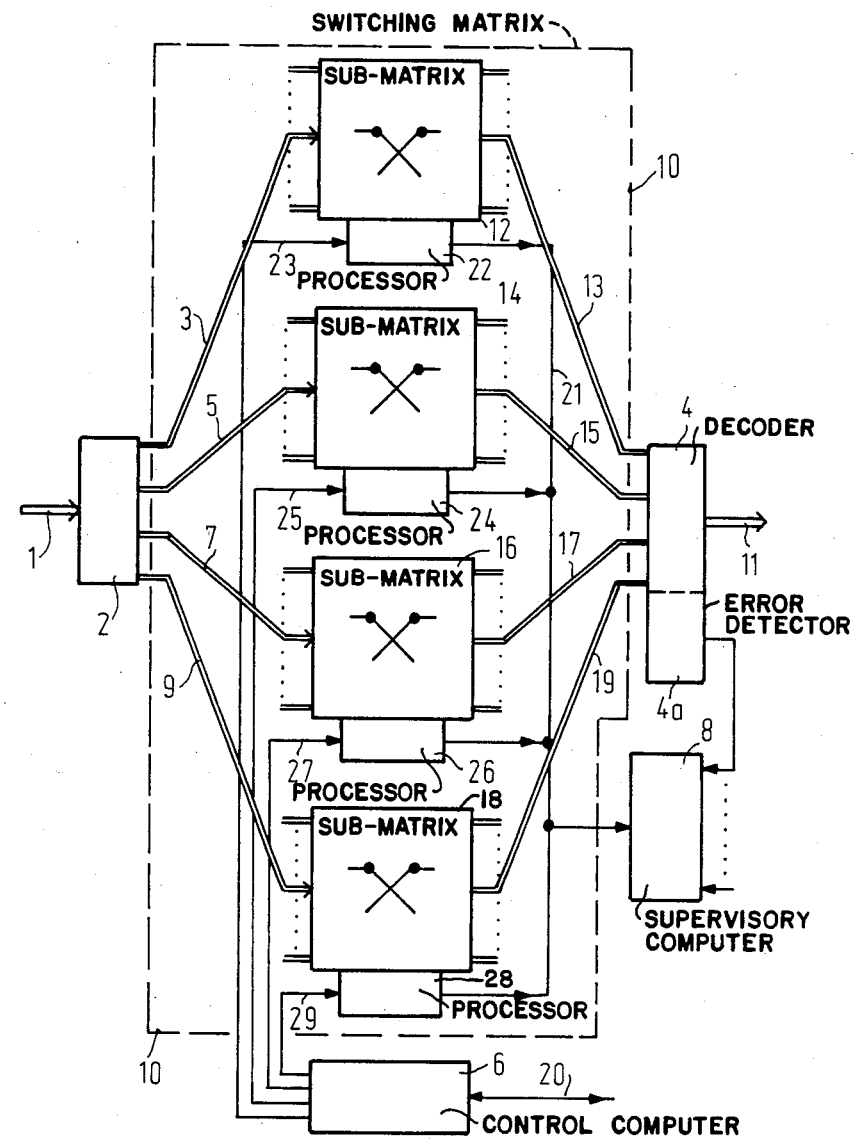
FIG. 1 is a block circuit diagram of a portion of a switching exchange with control computers and in which the switching matrix is separated into sub-switching matrices preceded by an encoder and followed by a decoder.

FIG. 1 shows a switching matrix 10 of a switching exchange, which is controlled by a switching control computer 6. Digital data words are applied, preferably bit-parallel, to this switching matrix 10 via a number of inputs of which only input 1 is shown here by way of example, each input, just like input 1, receiving a number of channels from always one subscriber in the time-interleaved mode and in the form of consecutive frames.

The switched-through or transmitted data are supplied from a number of outputs equal to the number of inputs, only one output 11 being shown here by way of example. Each output carries in the time-interleaved mode the data words from a number of channels equal to the number of channels applied to the inputs, but, because of the switching operation in switching matrix 10, other channels or in a different sequence, respectively. A complete switching exchange includes still further elements, for example line circuits for incoming and outgoing lines and possibly also multiplexers and demultiplexers which are here however not shown as they are not important for the description of the invention.

Each input of the switching matrix 10, just like input 1, is connected to an encoder 2 which produces a code word from each data word applied via the input 1. In the present example it is assumed that each data word comprises eight bits and that each code word comprises 16 bits. The code words produced by the encoder 2 are divided into sub-code words each having four bits, which are applied via separate connections 3, 5, 7 and 9 to respective sub-switching matrices 12, 14, 16 and 18. Each sub-switching matrix still has further inputs originating from corresponding outputs of the further inputs, not shown, of encoders preceding the switching matrix.

Similarly, the outputs of each sub-switching matrix are connected via the connections 13, 15, 17 and 19 to a number of inputs of a decoder assigned to each output, only the decoder 4 for the output 11 being shown here by way of example. Consequently, this decoder 4 receives at its input code words which correspond to the code words produced by the encoder 2 and, from each code word, restores the data word from which it is formed in the encoder 2 or another encoder not shown, and supplies it to output 11.

Thus, the encoding principle such as it is already described in said publication "Philips Technical Review", Vol. 41, 1983/84, number 1, pgs. 1 to 11 is used, but here only for protecting the data to be transmitted from faults, while also a different structure is used since for a data word to be transmitted only one encoder, for example, encoder 2, and only one decoder, for example the decoder 4, are present, whilst switching matrix 10 is arranged therebetween, which is divided into four sub-switching matrices which have identical structures. As a result thereof it is possible to produce the correct, that is to say error-free, data words at the output 11, even when a fault occurs in the data path through the sub-switching matrices 12, 14, 16 or 18. When a fault occurs simultaneously in two of these data paths this fault can at least be detected.

The switching matrix 10 is controlled by a switching computer 6 which in known manner receives via the line 20 the control data for the individual channels to be switched and determines therefrom the signals for the paths to be switched-through. In addition, the switching computer 6 performs a plurality of further tasks which are here, however, not of interest. The switching computer 6 can be protected from errors, more specifically in the manner described in said publication.

The control data, produced by the switching computer 6, for the paths to be switched-through are not directly used for setting the sub-switching matrices, but each sub-switching matrix 12, 14, 16 and 18 has its own setting processors 22, 24, 26 and 28 assigned to it, which themselves can be of a fault-tolerant structure and each of which receives via separate connections 23, 25, 27 and 29 the same control data and thereafter control in mutually the same manner the associated sub-switching matrix, for example in a space-switching network which switches the individual switching points, or in a time-division switching matrix which effects addressing of the store, respectively. The special structure of the sub-switching matrices, which may consist of a plurality of stages, is not of importance here. The setting processors 22, 24, 26 and 28 convey further data, which indicate the switched-through paths, to a supervising computer 8 via a common connection 21. Thus supervision computer further receives error signals produced in a portion 4a of the decoder 4 when a received code word is beset with errors, the error information produced by the decoder portion 4a furthermore indicating in which sub-code word the error was present, so that the connection between the error-detecting portion 4a of decoder 4 and the supervision computer generally consists of a plurality of lines for the transmission of a plurality of bits. The supervision computer also receives the error signals, which also comprise a plurality of bits, from further decoders, not shown. In addition, the supervision computer receives information about the switched-through paths via the connection 21 from the setting processors 22, 24, 26 and 28, so that in combination with the error signals it can accurately be determined which switched-through data paths are faulty.

The encoder 2 and also the decoder 4 with the portion 4a for producing the error signals can be of a conventional structure, for example in the form of a logic combining circuit or a Table in the form of a read-only memory which is addressed by the applied data words or code words, respectively. In this case the read-only memory for an encoder is of a limited capacity only, namely for 8-bit data words it requires a capacity of 256 addresses, each address storing a 16-bit code word, which is distributed via the output of the read-only memory over four connections 3, 5, 7 and 9, each carrying 4 bits. In contrast thereto, the store in the decoder must be of a much larger capacity as it receives via the connection 13, 15, 17 and 19 always in total a 16-bit code word as an address from the sub-switching matrices. Each address then contains indeed only one 8-bit data word or a multi-bit eror signal, respectively, but nevertheless the address volume has a very considerable effect on the cost and design effort required.

Figure 2:
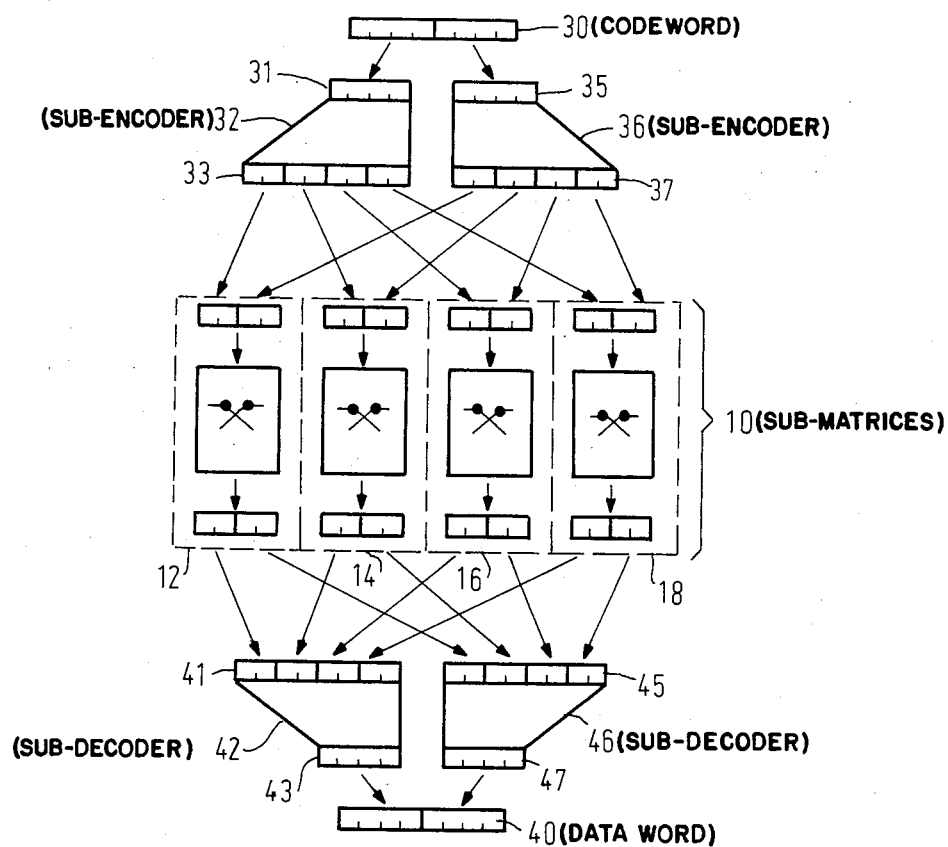
FIG. 2 shows a simplified circuit diagram of the encoders, sub-switching matrices and decoders for explaining the division of the data words.

In order to reduce these costs, FIG. 2 shows an arrangement comprising two sub-encoders 32 and 36 and two sub-decoders 42 and 46, the sub-decoders more specifically having an address capacity of only 8 bits each. To that end the symbolically shown 8-bit code word 30 is divided into two parts, each part comprising four bits. One of these two 4-bit portions is applied to the input 31 of the sub-encoder 32 and the other to the input 35 of the sub-encoder 36. Each of the encoders 32 and 36 produces at each output 33 or 37, respectively, only one 8-bit sub-code word. Both encoders 32 and 36 are of identical structures, that is to say they both produce the same sub-code words in response to the same input bit combination. It will be obvious that the two subdecoders 32 and 36 may also be comprised in one single encoder which includes a correspondingly larger read-only memory, or they may both be realized by one single read-only memory which is used in time-division multiplex for both encoders.

From the 8-bit sub-code words at the outputs 33 and 37 always two bits are combined into one sub-code word which is applied to a sub-switching matrix 12, 14, 16 and 18, so that each one of the two sub-code words is distributed over all the four switching matrices and is transmitted there.

The sub-code words occurring at the outputs of the sub-switching matrices 12, 14, 16 and 18, which always represent portions of the two sub-code words, are now, as indicated by the arrows, so distributed over the inputs 41 and 45 of the two subdecoders 42 and 46 that these inputs always contain a complete sub-code word.

Each sub-code word is converted in the corresponding sub-decoders 42 or 46, respectively into a 4-bit combination which corresponds to the corresponding bit combination at the input 31 or 35 of the respective sub-encoders 32 and 36, from which the sub-code word is produced. The coding is chosen such in the manner already described in the foregoing, that a fault or failure of one of the sub-switching matrices of each subdecoder 42 or 46 can produce from the correctly received 2-bit code word portions always the correct bit combinations at the respective outputs 43 and 47, the two bit combinations supplying the original 8-bit data word which is symbolically denoted by reference numeral 40. It is indeed true that the possibility to correct and detect faults is reduced by the division into two sub-decoders 42 and 46, but only to a practically very low extent. This is compensated for by the fact that the cost and design efforts for the decoders is significantly reduced, as each sub-decoder needs only to comprise one read-only memory with an address width of 8 bits, that is to say they do not require more than 256 addresses. Producing the error signal of the two sub-decoders 42 and 46 is not separately shown, as this is very obvious to a person skilled in the art.

Figure 3:
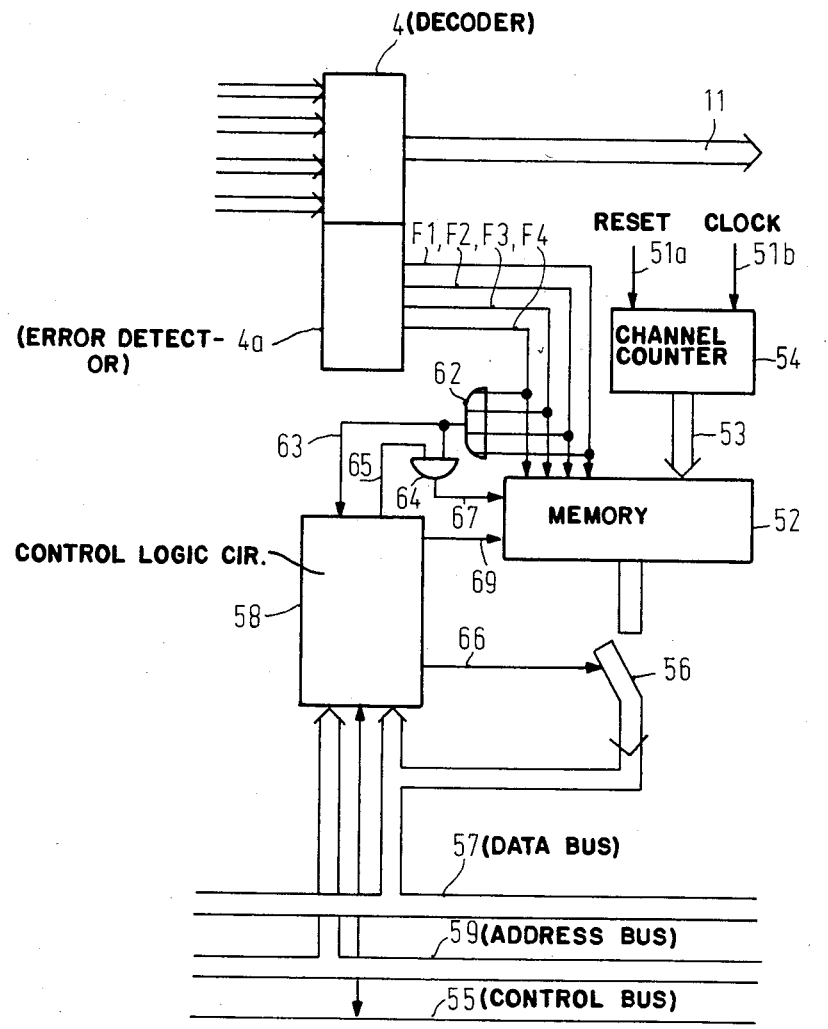
FIG. 3 is a block circuit diagram of processing the error signals coming from the decoder in the event of incorrectly transmitted data words.

Processing these error signals, that is to say transmitting them to the supervision computer, is shown in FIG. 3 for a decoder which, as in FIG. 2, may be formed by two sub-decoders, but alternatively also in a different manner. From the sub-code words applied to it the decoder 4 produces the data word on the connection 11; and in the error detecting portion 4a which, when implemented as a read-only memory, is only constituted by further outputs of the read-only memory, produces the error signals which are conveyed through lines F1 to F4. The error signals on these lines F1 to F4 are of a structure as shown in the following Table.

TABLE

| Fault in sub-switching matrix No. | Output signal at fault decoder | | | |
|---|---|---|---|---|
| | F1 | F2 | F3 | F4 |
| no fault | 0 | 0 | 0 | 0 |
| 1 | 1 | 0 | 0 | 0 |
| 2 | 0 | 1 | 0 | 0 |
| 3 | 0 | 0 | 1 | 0 |
| 4 | 0 | 0 | 0 | 1 |

The Table relates only to those cases in which there is either no fault or only one sub-switching matrix is faulty. When, for example, two sub-switching matrices are simultaneously disturbed, this can be detected by decoder 4, in which situation no data word is then conveyed anymore via the connection 11, but two of the lines F1 to F4 simultaneously carry a corresponding signal.

The lines F1 to F4 lead to the inputs of an intermediate store 52 and also to the inputs of an OR-gate 62, which when there is an error signal at one of the inputs, applies a corresponding signal via the line 63 to a control logic circuit 58. This logic circuit produces a corresponding signal at the control bus 55, which is connected to the supervision computer and reports to the computer that a fault has occurred in a decoder, that is to say in a transmission path.

Furthermore, signals which indicate the number of the channels which are at that instant switched in the switching exchange are applied to the intermediate store 52 via a line 53. In this example a channel counter 54 is provided which at each frame start in the switching exchange receives a resetting signal via the line 51a and at each new channel receives a counting clock signal via the line 51b.

The signal on the line 63 from the OR-gate 62, which is produced when a fault is reported, is also applied to a AND-gate 64 which is first enabled by a signal coming from the control logic circuit 58 via the line 65. As a result thereof a signal is produced on the output line 67 of the AND-gate 64 in the case of a fault report and consequently the signals present at the inputs of the intermediate store 52 are entered therein. As soon as the intermediate store 52 is full, the AND-gate 64 is rendered non-conductive via the line 65, so that when further error signals occur no information can be entered, that is to say these further error signals are ignored. When the intermediate store 52 is only a simple register, only one error signal with associated channel number can be entered. When the intermediate store 52 is provided with a plurality of storage locations, for example in the form of a FIFO, the number of stored error signals are counted in the control logic circuit 58 via the line 63 and, as soon as the store 52 is full, the AND-gate 64 is rendered non-conductive via the line 65.

When the supervision computer, not shown in FIG. 3, wants to retrieve the stored fault messages about which it has been informed by the signals on the control bus 55, it transmits via an address bus 59 an address which together with control signals from the controlbus 55 drives the control logic circuit 58, so that it closes the switch 56 at the output of the intermediate store 52 and conveys the fault report stored therein to the supervision computer via the data bus 57. When the intermediate store 52 comprises several storage locations for several fault messages, also several of these fault messages or all the fault messages can be transmitted sequentially. The control logic circuit 58 erases the read memory locations in the intermediate store 52 via the line 69. The AND-gate 64 is then enabled again, if so desired, so that thereafter new fault messages can be stored. On the basis of the retrieved fault messages and the channel numbers the supervision computer can accurately determine in combination with the transmission path information conveyed by the setting computers of the individual sub-switching matrices, the place where a possible failure in the arrangement has occurred.

Thus it is not only possible, inspite of a fault in the switching exchange, for example in the switching matrix, to obtain the applied data words correctly at the output, but, in addition, to accurately determine the place where the fault occurs, it being possible to remedy this fault by replacing a module, particularly when this module comprises a sub-switching matrix, and optionally the associated setting processor, without switching the arrangement off.

What is claimed is:

1. In a switching exchange for computer-controlled switching of a plurality of lines each of which receives digital time-interleaved data, which exchange comprises a switching matrix which transmits the data in parallel in the form of data words comprising a plurality of data bits, the improvement characterized in that: the switching matrix (10) is preceded by an encoder (2) which from each data word produces a code word having a number of code bits exceeding the number of data bits of each data word and applies it to the switching matrix (10); the switching matrix is divided into a number of parallel sub-switching matrices (12, 14, 16, 18) which each transmit a sub-code word consisting of the bits of a portion of the code word; and the switching matrix is followed by a decoder (4, 4a) which produces the original data words from all the sub-code words; the code words and the sub-code words being structured so that when there is at least one mutilated sub-code word the decoder produces the correct data words and an error signal indicating the mutilated sub-code word.

2. A switching exchange as claimed in claim 1, wherein the number of bits of each code word is twice the number of bits of each data word.

3. A switching exchange is claimed in claim 1 wherein each sub-switching matrix (12, 14, 16, 18) has its own, setting computer (22, 24, 26, 28) and all the setting computers are controlled in parallel by a central switching control computer (6).

4. A switching exchange as claimed in claim 1, wherein the encoder (2) preceding the switching matrix (10) comprises at least two sub-encoders (32, 36) each of which receives a different portion of the data words and produces a sub-code word; each sub-switching matrix (12, 14, 16, 18) respectively transmits as a sub-code word the bits from a different portion of a sub-code word, so that all the sub-switching matrices transmit all the sub-code words; and the decoder subsequent to the switching matrix (10) consists of a number of sub-decoders (42, 46) equal to the number of sub-encoders (32, 36), the sub-decoders being connected to the outputs of the switching matrix (10) such that each sub-decoder receives all the bits of a sub-code word and produces the corresponding portion of the data word.

5. A switching exchange as claimed in claim 1, wherein the error signal of the decoder is evaluated by a supervisory computer (8), further characterized in that: a fault memory (52) assigned to the decoder (4, 4a) is connected to the error signal outputs (F1 to F4) of the decoder (4, 4a) and to a counter (54) which identifies the transmission path through the switching matrix (10), said counter counting the data words within a frame; whereby upon the occurrence of an error signal such error signal and the identification of the transmission path are stored in the fault memory (52) and the supervisory computer (8) retrieves the content of the fault memory (52) and erases the fault memory.

6. A switching exchange as claimed in claim 5, characterized in that the fault memory (52) stores the signals of several sequentially occurring code word errors and the supervision computer (8) only erases the stored signals of the retrieved errors.

* * * * *